July 21, 1931. W. M. CASSETTY, JR., ET AL  1,815,831
LIGHT PROJECTOR
Filed Sept. 20, 1929   3 Sheets—Sheet 1
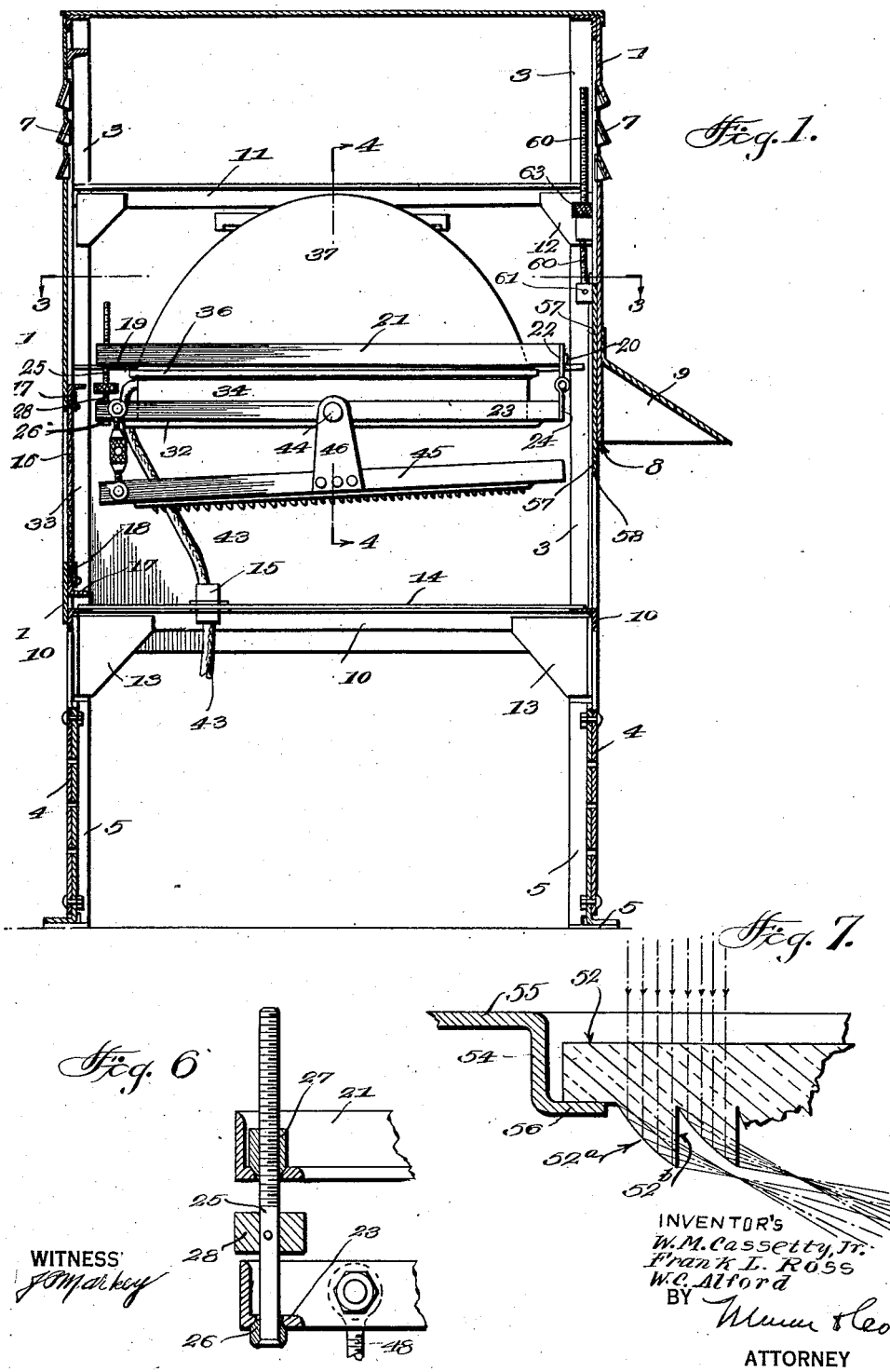
INVENTORS
W. M. Cassetty, Jr.
Frank L. Ross
W. C. Alford
BY
ATTORNEY

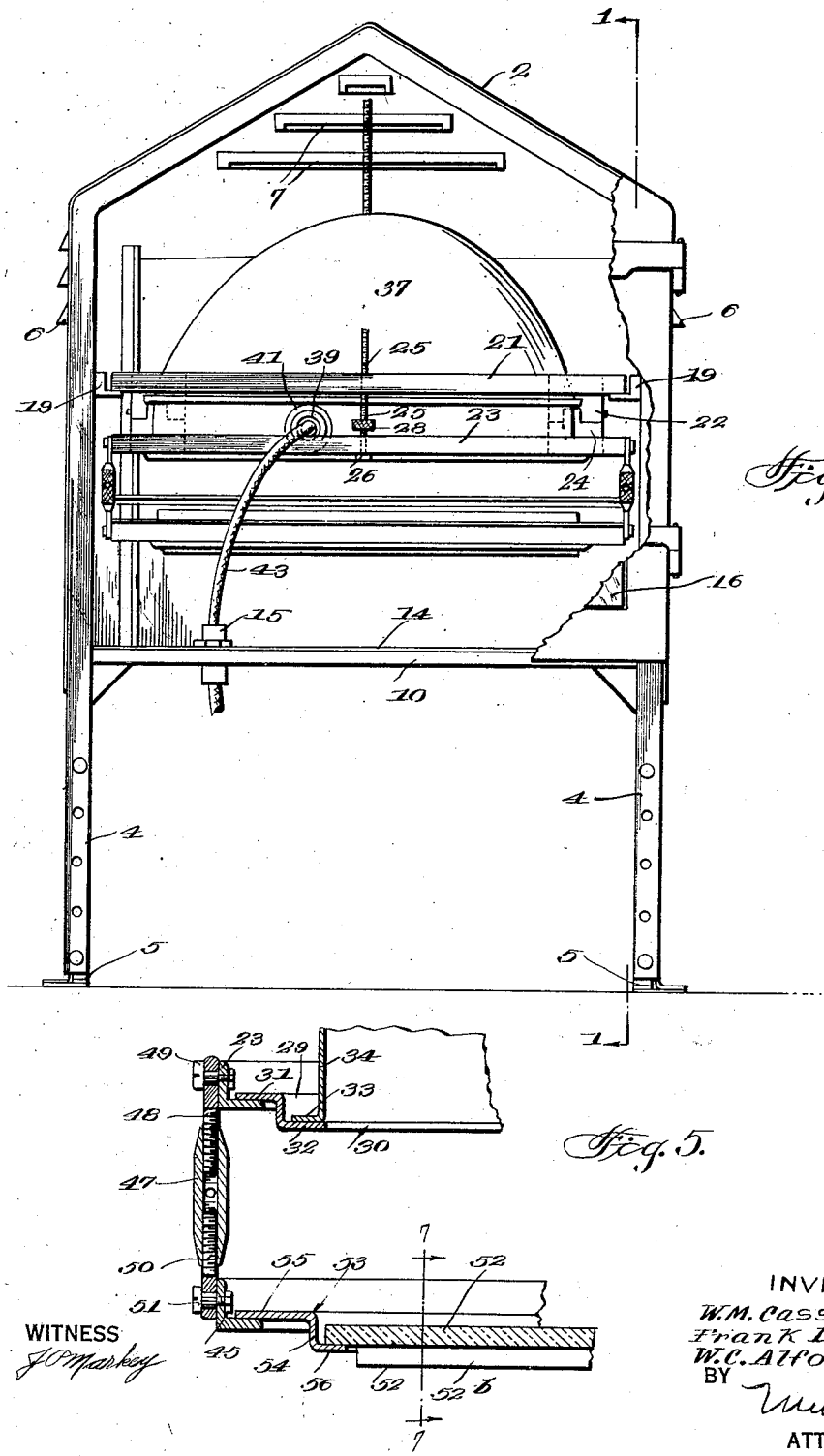

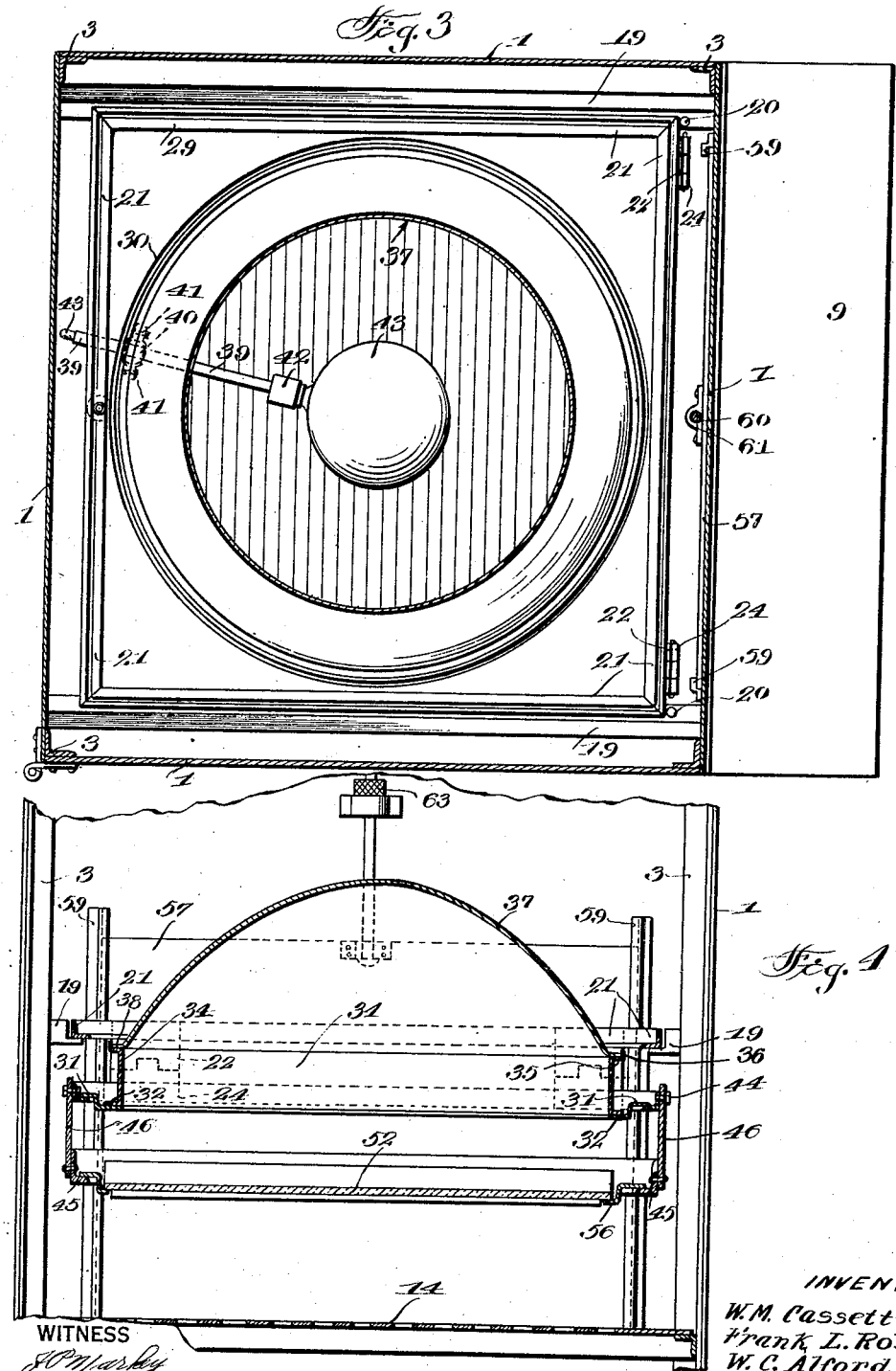

Patented July 21, 1931

1,815,831

UNITED STATES PATENT OFFICE

WILLIAM M. CASSETTY, JR., FRANK L. ROSS, AND WILLIAM C. ALFORD, OF NASHVILLE, TENNESSEE, ASSIGNORS TO DARKLITE CORPORATION, OF NASHVILLE, TENNESSEE, A CORPORATION OF TENNESSEE

LIGHT PROJECTOR

Application filed September 20, 1929. Serial No. 394,000.

This invention relates to light projectors of the indirect or concealed light source type shown in our co-pending application, Serial No. 305,045, and involves a light projector of this type which, while particularly designed as a non-glare "flood light" projector with particular reference to air field illumination, embodies structure and operative principles of general application to light projectors, including motor vehicle head lights used for illuminating the roadway in advance of the vehicle.

From one aspect, the invention constitutes an improvement of the construction disclosed in the aforesaid pending application in respect to the control and forward diversion of light rays reflected downwardly from a concealed light source by a surmounting inverted concaved reflector to a ray diverting element such as a refracting prismatic lens positioned therebeneath and functioning to divert forwardly the rays passing downwardly thereto from said reflector.

In our co-pending application, aforesaid, and in the present invention, an outer casing encloses therein a reflecting dome in the form of an inverted concave or parabolic reflector having its axis substantially in the vertical and its open lower end substantially in the horizontal and within which a radiant light emitting bulb is supported in focal relation, and a light diverting element in the form of a refracting lens is supported therebelow in a substantially horizontal plane and is adjustable about a substantially horizontal axis to correlate its refracting surface to the lines of light rays reflected downwardly from said reflecting dome and divert said rays forwardly at varying angles to the vertical, a light trimming shield or plate having a substantially horizontal lower light trimming edge, being mounted on said casing at its forward side for vertical adjustment of said lower trimming edge to variably limit the vertical height of the forwardly diverted light rays.

Where, as in the present invention, a light diverting element, such as a prismatic refracting lens, is employed in conjunction with an inverted parabolic reflector, definite angular correlation of the lines of rays reflected downwardly to the light diverting faces or prisms of the diverting element is necessary to secure the best results in illumination and proper control of the light rays.

A feature of the present light projector consists in the provision of a light diverting element, such as a prismatic refracting lens, extending in a substantially horizontal plane and adjustable about a substantially horizontal axis alining substantially with the axis of an inverted parabolic reflector forming a reflecting dome and mounted within an enclosing outer casing with its lower open end above and overlying said light diverting element and extending substantially in the horizontal and its axis extending substantially in the vertical with a radiant light emitting element supported within said deflecting dome in focal relation thereto.

Since it is characteristic of parabolic reflectors that light emanated at their focal point and impinging their sides is reflected thereby in lines parallel to the axis of the parabola, a light diverting element, such as a prismatic refracting lens or its equivalent, which extends in a plane substantially parallel with the open end of the reflector and is adjustable about a horizontal axis in line with the axis of the reflector parabola, has the function and advantage of correlative adjustment of the angle of its light diverting surfaces or prisms to the line of reflected rays in parallel with the reflector axis to give the desired angle of forward diversion or refraction of said rays.

In accordance with the invention and as a further feature thereof, a diverting element of this type is used in the combinative relation recited above and is formed with a series of ray diverting surfaces extending in parallel with each other and with the horizontal axis of adjustment of the diverting element so that the reflected lines of rays may be effectively correlated to the angle or curvature of the diverting surfaces to effect the desired forward diversion of the rays.

As a further and related feature of the invention, the reflector with its light element and the diverting element or lens are mounted for unitary complementary tilting adjustment about a second and substantially parallel horizontal axis so that the stream of forwardly diverted light rays as secured by the first tilting adjustment, may be variably swung to varied angles of forward projection. To limit the vertical height of the ray stream thus projected, a shield plate having a lower substantially horizontal light trimming edge is mounted on the front of the casing for vertical adjustment, its lower edge being positioned adjacent the horizontal plane of the ray diverting lens or other similar element. The horizontal axis upon which the reflector and diverting lens tilt for unitary complemental adjustment is preferably located at the front of the casing so that downward bodily tilting adjustment of the rear end of the reflector and lens as a unit may be effective to swing the angle of the forwardly diverted light ray stream toward the horizontal.

Further features of the invention consist in the construction of the outer casing for ventilation to reduce heat, for accessibility to the interior, and for support to project a substantially horizontal stream of light without glare, thereby providing a flood light particularly adapting the device for lighting areas where blinding glare constitutes a peril, as in the case of automobile head lights on road ways and light projectors or flood lights for air plane landing fields, etc.

These and other features of the invention, including details of construction and arrangement, will be more clearly apparent from the following detailed specification, which is to be read in conjunction with the accompanying drawings forming part thereof and in which:—

Figure 1 is a longitudinal vertical section from rear to front of a light projector constructed in accordance with the present invention, the section being taken on line 1—1 of Figure 2.

Figure 2 is a rear elevation of the light projector with the hinged door forming the back of the casing broken away to disclose the interior arrangement.

Figure 3 is a horizontal section through the casing taken on line 3—3 of Figure 1.

Figure 4 is a fragmentary transverse vertical section taken on line 4—4 of Figure 1.

Figure 5 is an enlarged fragmentary detail in vertical section showing one of the adjusting means for the light diverting elements.

Figure 6 is a similar fragmentary detail showing the complementary adjustment means for the reflector and lens holding frames as a unit.

Figure 7 is a fragmentary transverse sectional view of a portion of a light diverting lens which may be used, illustrating the forward diversion of the downwardly reflected light rays.

An outer casing having sides 1 and rectangular cross section and having a peaked top 2 providing a rain shed and an open bottom side, is provided, when used as a flood light projector for air fields etc., with its corner angle irons 3 to which the sides are attached, depending from the bottom of the casing as legs 4 and having separate foot standards 5 vertically adjustable thereon as shown in Figure 1. Ventilating louvres 6 are preferably formed in the sides and similar louvres 7 in the peaked top to dissipate the heat of the light bulb.

The bottom of the front wall of the casing terminates at 8, Figure 1 and preferably mounts on its exterior a hood 9 to shield the interior of the casing from rain, dust etc. Below the front bottom edge 8, angle iron bars 10 connect with the vertical angles 3 to cross brace the casing at this point and similar angle irons 11 cross connect with the vertical angle 3 at the base of the peaked top 2 and cross brace the casing at this point also. Gussett plates 12 at the top angles 11 and 13 at the lower angles 10 may be used to impart rigidity to the structure at the points of connection of the cross angles 10 and 11 to the vertical frame angles 3.

A floor 14 overlaid on the cross angle bars 10, and perforated for drainage as shown in Figure 4 is used to protect the interior of the casing from beneath. A light cable or conduit thimble 15 is carried by one cross bar angle iron 10 to lead in the wire or conduit carrying current to the electric bulb hereafter described.

The back wall of the casing is hinged as shown in Figures 2 and 3 to constitute a door closing the rear side and providing for access to the interior. Adjacent its lower edge, it is cut out to provide an opening. A glass, preferably red in color, is applied over said opening from the interior of the casing to furnish a warning light at the rear of the casing and is held at its upper and lower edges between angled edging bars by clamping bars 18 or other suitable means overlying the edges of the glass and edging bars.

As shown most clearly in Figures 2–4, angled guide bars 19 extend in horizontal alinement transversely of the side walls of the casing above the front bottom edge 8 and form supports for an articulated reflector, light bulb and diverting lens assembly which is conveniently placed therein from the rear door side. Pins 20 upstanding from these guide bars adjacent their front ends, serve as stops engaged by the front end of the top frame of this assembly to properly position it within the casing.

This assembly comprises a top rectangular frame 21 of angle iron, the side edges of which rest on the top horizontal faces of the guide bars 19 so that the frame 21 may slide inwardly over the guide bars, similarly to a drawer, through the open back closure or door to engage the stop pins 20 with its forward edge and be positioned thereby.

A large rectangular opening is provided within the interior edges of the frame 21 through which an inverted parabolic reflector may project upwardly. A pair of hinge leaves 22 are fastened to and depend from the front face of frame 21. A rectangular frame 23, similarly sized and formed of angle iron underlies the frame 21 and is supported therefrom at its forward edge in vertically spaced relation thereto by an alining pair of hinge leaves 24 attached to its forward face and upstanding therefrom to connect with the lower ends of the depending hinge leaves 22 by the usual pintle pin. The frame 23, which supports and carries an inverted parabolic reflector and radiant light emitting electric bulb as later described, extends in a substantially horizontal plane variably adjustable. This adjustment, as detailed in Figure 6, is provided by a vertically extending adjusting stem 25 passing through vertically alined bores in the rear bars of the angle irons of frames 21 and 23 midway of their transverse lengths and centrally between the pairs of hinge leaves 22—24. The bores through the angle irons 21, 23, are countersunk and rounded upon the upper and lower faces of bars 21, 23 respectively. A sleeve 26 having a rounded upper end is attached to the lower end of the stem 25 to provide a rounded head for the stem having a rocking fit within the rounded countersunk lower face of the rear angle bar of frame 23 and supports the rear end of the frame. The upper end of the stem 25 is threaded and is threadedly engaged by a sleeve 27 having a rounded lower end providing a rocking fit in the rounded countersunk upper face of the rear angle bar of frame 21. Between the frames a knurled adjusting nut 28 is pinned or otherwise fixed to the stem 25. The weight of the frame 23 holds the sleeve 27 in its rounded countersunk socket and rotation of the stem 25 through its nut will raise or lower the rear end of the frame 23 relative to the top support frame 21. This adjustment means is complementary to an initial adjustment of a lens holding frame suspended from frame 23 and adjustable relatively thereto in a manner which will later be described.

A reflector and light bulb are carried on frame 23 in the following manner. Referring particularly to Figures 3, 4 and 5, it will be seen that a rectangular horizontal plate 29 having a large central circular opening 30 (Fig. 3) is vertically shouldered between its inner and outer edges to provide an elevated rectangular outer edge 31 (Fig. 4) seating over the upper horizontal faces of the angle bars of frame 23, and a lower circular inner edge flange 32. The lower outwardly flanged edge 33 of a vertically extending circular light bulb band 34 rests on and is supported by the inner edge 32 of frame 23. Its upper edge is formed also with an outwardly extending horizontal circular flange 35 having a vertically upstanding retaining edge 36.

An inverted parabolic reflector 37 with its axis approximately on the vertical has its lower open end extending substantially in the horizontal and extends upwardly through the opening 30 and is provided at its lower end with an outwardly extending edge flange 38 resting on the ring flange 35 and retained and centered thereon by the flange edge 36. A wire or electric conduit carrying tube 39 (Figs. 2 and 3) is carried and longitudinally adjustable through a ball sleeve fixed for universal movement between hemi-spherically cupped plates fixed to opposite vertical faces of the ring 34 and overlying a horizontal bore therethrough. A standard screw socket 42 (Fig. 3) for the base of a radiant light-emitting electric light bulb 43 is fixed to the inner end of tube 39 whose universal movement through the described ball socket mount and longitudinal adjustment therethrough provides for the positioning of the light filament in focal relation to the parabolic reflector 37.

The inner end of the current conducting wires of the cable 43 extending through tube 39 are appropriately connected with the terminals in socket 42, the cable extending downwardly from the tube and being guided outwardly from the casing through sleeve 15 to connect with the current supply. The reflector, light ring and light bulb are, therefore, carried by and adjustable with the frame 23 as a unit.

In the axis of the parabolic reflector, denoted by the line of section 4—4 on Figure 1, pivot studs 44 outstand horizontal from the angle iron sides of frame 23. A rectangular lens-carrying frame 45 of angleiron and corresponding in size to frame 23 is suspended therefrom for tilting adjustment about the horizontal axis of pivot studs 44, which as stated, are in substantial alinement with the axis of the parabolic reflector 37, by means of vertically extending straps 46 journaled centrally at their upper ends on the studs 44 and rigidly fixed at their lower ends to the vertical sides of the side angle iron bars of frame 45 at a point midway between its front and rear ends. Adjustment of the lens frame 45 about the horizontal axial pivot point 44 is effected by vertical internally and reversely threaded sleeves or turn buckles 47, whose upper threaded links 48 (Fig. 5) are attached at the upper ends by pivot studs 49 to the vertical side faces of the side angle bar iron of frame 23 adjacent to their rear ends and whose lower and reversely threaded links 50 are attached at their lower ends by pivot studs 51 to the vertical side faces of the side angle iron bars of frame 45, at vertically alined points adjacent to their rear ends. The pair of turn buckles and their links are alined transversely of the casing and the threaded turn buckle sleeves positively hold the frame 45 fixed in its tilted adjustment relatively to the reflector frame 23 so that once this adjustment has been fixed, both the reflector and lens frames can be tilted as a unit by the adjusting stem 25 about the second and substantially parallel horizontal axis of the forwardly positioned hinges 22, 24, connecting the reflector frame 23 to the upper support frame 21, the purpose of which will be later described.

A light diverting circular glass lens 52 is centered in and supported by the frame 45 by means of a rectangular horizontal plate 53 similar to plate 29 of the reflector frame 23, and similarly having a large central circular opening closed from above by the lens 52, and vertically and circularly shouldered at 54 (Fig. 5) between its inner and outer edges to provide a rectangular outer edge flange 55 seating on the upper horizontal faces of the angle iron bars of frame 45 and a lower circular inner edge flange 56 upon the horizontal upper face of which rests the lower face of the lens adjacent to its outer edge, the lens being centered relatively to the lens opening in frame 53 by its circular vertical shoulder 54.

The light diverting element or lens 52, extends in an approximately horizontal plane underlying the substantially horizontal lower end of the reflector and is of a type designed to divert forwardly light rays reflected downwardly thereto by the parabolic reflector. One form of light diverting element of this type particularly adapted for use in the particular axially supported relation of such an element to a superposed inverted parabolic reflector, with its reflected focal light rays extending in parallel with its axis comprises, as shown, a transparent glass lens 52 having a smooth flat upper face and provided on its under face with a series of parallel transversely extending ribs 52a extending in parallel with the horizontal adjustment axes 44 of the lens frame (as shown in Fig. 5) which axis, as stated, alines with the axis of the parabolic lens. The front faces 52b of these ribs are flat and substantially perpendicular to the plane of the upper flat face of the lens. The rear or reflecting faces of these ribs are curved or convexed rearwardly on curves generated to reflect forwardly with a downwardly inclined component converging bands of light rays. While this type of reflecting or diverting lens is of particular utility in this connection, other light diverting or reflecting members or lens having similar reflecting characteristics may be employed.

The forward end of the lens 52 and its frame, is, as shown, in a horizontal plane somewhat below the bottom forward edge 8 of the front wall 1 of the casing. The adjustment provided for the lens frame 45 about the horizontal axis 44 lying in the parabola axis enables the reflecting faces of the lens ribs 52a to be brought at that angle or correlated to the lines of downwardly reflected rays to give the desired inclination of forward reflection toward the horizontal as permitted by the angular relation of the lines of rays reflected downwardly by the parabolic reflector to the impinged reflecting surfaces of the lens or similar light diverting element.

This adjustment having been secured, the stream of forwardly diverted light rays may now be directed as a unit horizontally upwardly or downward toward or from the horizontal through the tilting adjustment by stem 25 of the reflector and lens frames as a unit about the forwardly located horizontal axis of the hinge leaves 22, 24.

In order to determinately limit the vertical height or top line of the stream of forwardly projected light rays and to trim off and prevent the forward projection above that line of any stray rays emanated, we have provided at the forward side of the casing a shield plate 57 having a substantially horizontal light-trimming lower edge 58. This plate extends across the inner face of the front side or wall 1 of the casing in front of the lens and transversely for its full diameter. Its vertical side edges are enclosed within the inner edges of parallel guides 59 (Figs. 3 and 4) attached to and extending vertically of the inner face of the front casing wall 1. Vertical adjustment of this shield plate to vary the vertical height of its lower horizontal light trimming edge is effected by means of a stem 60 having its lower end fixed in a bracket 61 (Figs. 1 and 3) fixed centrally to the inner face of the shield plate at its upper end. The stem 60 is threaded and extends upwardly through a second bracket 62 fixed to the front wall 1 above the shield plate. A knurled nut 63 threading on the stem 60 above bracket 62 acts as an adjustable stop variably fixing the extent to which the shield plate may be lowered or raised. Obviously, the plate is slid down in its guides 59 until the stop nut 63 impinges the bracket 62. The vertical height of the stream of forwardly projected rays of light may, therefore, be determinately limited so that it may not cause blinding glare in the eyes of a person on a roadway in advance thereof, or of the pilot of a plane, for example, landing on an air field, illuminated by such light, when the projector is used to illumine an air field. While the light projector as shown and described, is particularly adapted for flood lighting purposes without glare, it is equally applicable in principle and fundamental structure to light projection generally, including head lights for motor vehicles, etc., where the advantages of its light control and glare prevention is obvious, and is therefore subject to modification in structure and arrangement to suit different conditions of manufacture and use, in consonance with the spirit of the invention and the scope of the appended claims.

What we claim, therefore, and desire to secure by Letters Patent is:

1. A light projector comprising a casing, a frame mounted therein and tiltable about a horizontal axis, an inverted concave reflector carried by said frame with its axis in a plane approximating the vertical and with its lower open end in a substantially horizontal plane, a radiant light emitting bulb supported within said inverted reflector, a second frame tiltably supported by and below said first mentioned frame, a light diverting means carried by said second frame and underlying the lower end of said reflector and extending in an approximately horizontal plane, said diverting means being formed to divert forwardly therefrom light rays emitted by said bulb and reflected downwardly thereto by said reflector, means for effecting a tilting adjustment of said second frame about its axis and relative to said first frame, and means for effecting a unitary complementary tilting adjustment of said first and second mentioned frames about the axis of said first mentioned frame.

2. A light projector comprising a casing, a frame tiltably supported within said casing, an inverted parabolic reflector carried thereby with its axis in a plane approximating the vertical and with its open lower end in a substantially horizontal plane, a radiant light emitting bulb supported within said inverted reflector in focal relation thereto, a second frame pivotally supported from the first mentioned frame, a light diverting element supported thereby and underlying the lower open end of said reflector and extending in a substantially horizontal plane, said element being formed to divert forwardly therefrom, light rays emitted by said bulb and reflected downwardly thereto by said reflector, and means for effecting a titlting adjustment of said second frame and said light diverting element about a substantially horizontal axis lying substantially in the axis of the parabolic reflector, to correlate the line of downwardly reflected light rays to the light diverting surface of said diverting element for forward diversion of said downwardly reflected light rays.

3. A light projector comprising a casing, a horizontally tiltable frame supported within said casing, an inverted parabolic reflector carried by said frame with its axis in a plane approximating the vertical and with its open lower end in a substantially horizontal plane, a radiant light emitting bulb supported within said inverted reflector in focal relation thereto, a second tiltable frame suspended from the first mentioned frame, a light diverting element carried by said second frame and underlying the lower open end of said reflector and extending in a substantially horizontal plane, said element being formed to divert forwardly therefrom, light rays emitted by said bulb and reflected downwardly thereto by said reflector, a shield plate mounted at the forward side of said casing and having a substantially horizontal lower light trimming edge, means for effecting adjustment of the lower edge of said plate vertically to limit the vertical height of projection of the stream of forwardly diverted light rays, and means for effecting a tilting adjustment of said second frame and said light diverting element about a substantially horizontal axis lying substantially in the axis of the parabolic reflector, to correlate the line of downwardly reflected light rays to the light diverting surface of said diverting element for forward diversion of said downwardly reflected light rays.

4. A light projector comprising a casing, an inverted parabolic reflector housed therewithin with its axis in a plane approximating the vertical and with its open lower end in a substantially horizontal plane, a radiant light emitting bulb supported within said inverted reflector in focal relation thereto, a light diverting element supported below and underlying the lower open end of said reflector and extending in a substantially horizontal plane, said element being formed to divert forwardly therefrom, light rays emitted by said bulb and reflected downwardly thereto by said reflector, and means for effecting a tilting adjustment of said light diverting element about a substantially horizontal axis lying substantially in the axis of the parabolic reflector, to correlate the line of downwardly reflected light rays to the light diverting surface of said diverting element for forward diversion of said downwardly reflected light rays, means for effecting a complementary tilting adjustment of said reflector and said adjusted diverting element as a unit about a second and substantially parallel horizontal axis to vary the angle of forward diversion of the stream of light rays toward the horizontal and a shield plate mounted at the forward side of said casing having a substantially horizontal light trimming edge and vertically adjustable variably to limit with said edge the vertical height of the stream of forwardly diverted light rays.

5. A light projector comprising an outer casing having a closured open back, and having therewithin at opposite sides horizontally extending support flanges, a centrally open support frame bodily slidable from the closured rear of said casing on to said flanges to rest thereon for support, a centrally open reflector supporting frame positioned therebelow substantially in parallel with said support frame and hinged thereto at the front of said casing for tilting movement about a substantially horizontal axis, means adjustably connecting said frames at the rear for swinging adjustment of the reflector frame about said axis, an inverted parabolic reflector seated on said reflector supporting frame in inverted position with its axis approximately in the vertical and its lower open end approximately in the horizontal, a radiant light emitting element positioned within said reflector in focal relation thereto and supported on the reflector frame for adjusting movement with said reflector, a lens frame pivotally hung from said reflector frame for tilting movement about a substantially horizontal axis in substantial alinement with the axis of the parabolic reflector, adjusting means connecting said lens and reflector frames for tilting adjustment of the lens frame relatively to the reflector frame about said horizontal axis, a lens mounted on said frame to underlie the lower open end of said reflector and to extend in a substantially horizontal plane, said lens being formed to divert forwardly light rays reflected downwardly thereto from said parabolic reflector, and a plate having a substantially horizontal light trimming edge supported at the front of said casing for vertical adjustment of its lower edge variable to limit the vertical height of the light rays diverted forwardly by said lens.

6. A light projector comprising a casing supported with its bottom side elevated above the ground, a frame supported therein and tiltable about a horizontal axis, an inverted parabolic reflector supported within said frame with its axis approximately in the vertical and with its lower open end approximately in the horizontal, a second frame pivotally supported from the first mentioned frame, a radiant light emitting bulb carried by said frame so as to be supported in said reflector in focal relation thereto, a light diverting element supported at the bottom of said casing below the open lower end of said reflector to extend in an approximately horizontal plane and provided with light diverting surfaces formed to divert forwardly light rays emitted by said bulb and reflected downwardly thereto by the parabolic reflector, means for affecting tilting adjustment of said second frame relatively to said first mentioned frame, and means for effecting a complementary tilting adjustment of both of said frames and said light bulb about the axis of said first mentioned frame to vary the inclination toward the horizontal of the stream of forwardly diverted light rays.

7. A light projector comprising a casing having legs depending therefrom to support said casing above the ground, an inverted parabolic reflector supported within said casing with its axis approximately in the vertical and its lower open end substantially in the horizontal and above the open bottom side of the casing, a radiant light emitting bulb supported within said reflector in focal relation thereto, a light diverting lens supported at the bottom of said casing to underlie the lower open end of the reflector and extend in a substantially horizontal plane, said lens having light diverting surfaces arranged to divert forwardly light rays reflected downwardly thereto by said reflector, means for effecting tilting adjustment of said lens relative to said reflector and to the horizontal about a substantially horizontal axis lying substantially in the axis of said reflector, means for effecting a complementary tilting adjustment of the reflector, bulb and lens as a unit about a second and substantially parallel horizontal axis forwardly of the axis of said reflector to vary the inclination toward the horizontal of the stream of forwardly diverted light rays, and a shield plate supported at the forward side of the casing having a substantially horizontal light trimming lower edge approximately in the plane of said lens and vertically adjustable to cause said edge variably to limit the vertical height of the forwardly diverted light rays.

8. A light projector comprising a casing, an adjustable tilting frame supported therein, a parabolic reflector carried by said frame, a light source positioned within said reflector, a second frame pivotally supported by said first mentioned frame for tilting adjustment relative thereto, a light diverting element carried by said second frame, said reflector being adapted to project light rays to said light diverting means, and means for effecting the tilting adjustment of each of said frames.

9. A light projector comprising a casing, a reflector frame pivotally supported at one end within said casing for tilting movement about a substantially horizontal axis, means supporting the other end of said frame for swinging adjustment, an inverted reflector carried by said reflector frame and having its axis approximately in the vertical, a light source positioned within said reflector and in focal relation thereto, a deflector frame pivotally supported from the reflector frame for tilting movement about a substantially horizontal axis, adjusting means connecting said frames for tilting adjustment of said deflector frame relative to said reflector frame, and a deflector carried by said deflector frame adapted to divert light rays reflected downwardly thereto by said reflector.

WILLIAM M. CASSETTY, Jr.
FRANK L. ROSS.
WILLIAM C. ALFORD.